March 15, 1932. W. H. STANSBERRY 1,849,338
ANTIGLARE SHIELD
Filed May 29, 1929
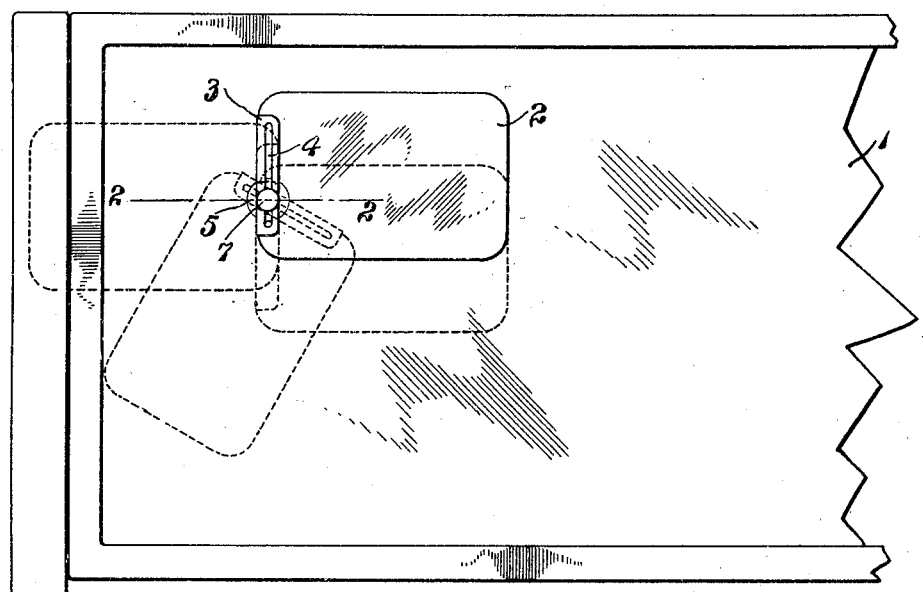
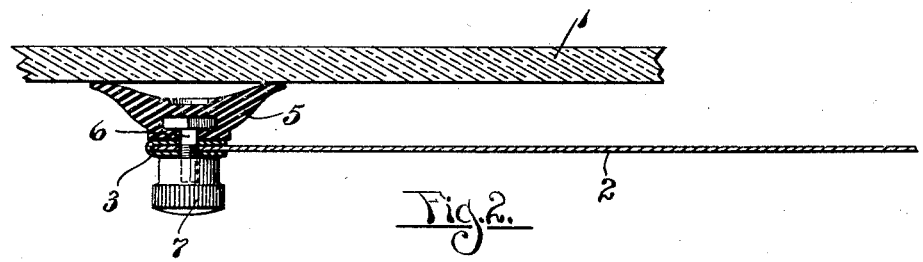
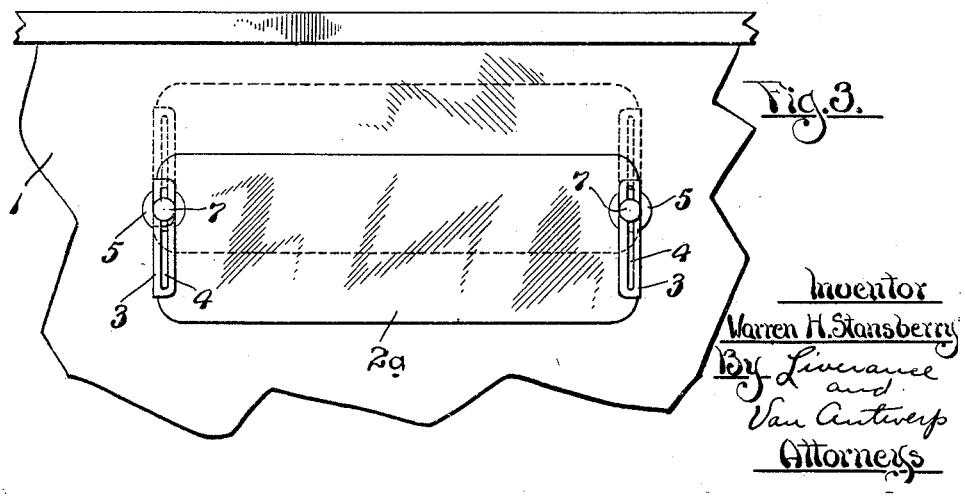

Patented Mar. 15, 1932

1,849,338

UNITED STATES PATENT OFFICE

WARREN H. STANSBERRY, OF GRAND HAVEN, MICHIGAN, ASSIGNOR TO PEERLESS NOVELTY COMPANY, OF GRAND RAPIDS, MICHIGAN, A CORPORATION OF MICHIGAN

ANTIGLARE SHIELD

Application filed May 29, 1929. Serial No. 366,836.

This invention relates to an anti-glare shield particularly adapted for use on automobiles for eliminating the glare of light coming to an automobile in which it is installed.

It is an object and purpose of the present invention to provide a very simple construction of anti-glare shield which is very easily applied to the windshield or back window of an automobile for intercepting the glaring rays of light coming from headlights, at the front or rear, of other automobiles, from street lights, from the sun, or from reflection of lights on wet streets, and the shield is one which may be adjusted to different positions on the windshield or rear window glass after it has been attached thereto, this being desirable in many instances.

An understanding of the invention may be had from the following description taken in connection with the accompanying drawings, in which, Fig. 1 is an elevation illustrating one form of the anti-glare shield attached at the rear side of a windshield glass and showing, in dotted lines, some of the positions to which the shield may be readily adjusted.

Fig. 2 is an enlarged horizontal section substantially on the plane of line 2—2 of Fig. 1, and Fig. 3 is a fragmentary elevation showing a different form of construction of the shield attached to the glass.

Like reference characters refer to like parts in the different figures of the drawings.

The glass, indicated at 1, to which the antiglare shield may be applied may be any glass in an automobile body, such as the wind shield, or rear window. The anti-glare shield includes a section 2, of flat colored celluloid preferably, though the shield may be of any suitable material which will intercept the blinding and glaring rays of light but pass sufficient rays of light that approaching vehicles may be readily discerned. The color of the shield 2 is ordinarily green or amber but the particular color used is not necessarily either one or the other named.

At one edge of the anti-glare shield 2, as shown in Figs. 1 and 2, a U-shaped clip 3 of sheet metal is permanently secured extending almost the full width of the shield. The edge of the shield is located between the legs of the U-shaped clip which are permanently secured in any desired manner. The clip and the shield are slotted lengthwise of the clip, as indicated at 4, making an elongated slot as fully as shown in Fig. 1.

A rubber suction cup 5 is used with this construction in which the head of a screw threaded stud 6 is embedded, the shank extending from the suction cup. The shank may be passed through the slot 4 and a binding nut 7 threaded on its outer end, whereby the anti-glare shield may be secured in fixed relation to the suction cup 5. The suction cup 5 is secured to the surface of the glass in the usual manner by moistening the glass and pressing the cup against the glass with considerable pressure and then releasing the same whereby the cup is held by air pressure on the glass.

The anti-glare shield 2 is adjustable to an indefinite number of different positions about the axis of the stud 6, and on the stud 6 by reason of the elongated slot 4 through which the stud passes. In Fig. 1 some of these positions are indicated in dotted lines through a great many others obviously may be occupied by the anti-glare shield.

In Fig. 3 a somewhat different form of the invention is shown. The anti-glare shield 2a has one of the U-shaped clips 3 at each end secured thereto and a stud 6 with a suction cup 5 is used with each of the clips 3 passing through the slots 4 and receiving the clamping nuts 7. This shield may be adjusted to any number of vertical positions within the range permitted by the slots 4.

The construction while of simple character is very practical and useful, may be manufactured at a very low cost, is readily attached to the glass of an automobile and may be quickly and easily shifted and adjusted to a desired position after attachment without removing the suction cups. The invention is defined in the appended claim and is to be considered comprehensive of all forms of structure coming within its scope.

I claim:

An anti-glare vision shield adapted to be attached to the windshield of an automobile comprising, a section of colored celluloid or the like having a U-shaped clip fastened thereto at opposite ends thereof, said clips being of relatively short length whereby they leave an unobstructed field of vision along the sides of the section and also above and below the end portions thereof, vacuum cups, adapted for detachable connection to the windshield, located near the said clips and means for adjustably connecting the said clips to the said cups for the purposes described.

In testimony whereof I affix my signature.

WARREN H. STANSBERRY.